ated States Patent (12) United States Patent
Campbell (10) Patent No.: US 9,325,916 B2
(45) Date of Patent: *Apr. 26, 2016

(54) CINEMATIC IMAGE BLUR IN DIGITAL CAMERAS BASED ON EXPOSURE TIMING MANIPULATION (71) Applicant: GoPro, Inc., San Mateo, CA (US)

(72) Inventor: Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,769

(22) Filed: Nov. 18, 2014

(65) Prior Publication Data
US 2015/0062383 A1 Mar. 5, 2015

Related U.S. Application Data (63) Continuation of application No. 13/486,707, filed on Jun. 1, 2012, now Pat. No. 8,917,330.

(51) Int. Cl.
*H04N 5/235* (2006.01)
*H04N 5/335* (2011.01)
*H04N 5/351* (2011.01)
*H04N 5/262* (2006.01)
*H04N 5/232* (2006.01)

(52) U.S. Cl.
CPC .......... *H04N 5/351* (2013.01); *H04N 5/2353* (2013.01); *H04N 5/23232* (2013.01); *H04N 5/23277* (2013.01); *H04N 5/2621* (2013.01)

(58) Field of Classification Search
CPC .......... H04N 5/2352; H04N 5/2351; H04N 5/23248; H04N 5/335; H04N 5/2353; H04N 5/23287; H04N 5/23258; H04N 5/372
USPC .......... 348/229.1, 362, 208.12, 208.4, 312
See application file for complete search history.

(56) References Cited

U.S. PATENT DOCUMENTS

| 8,514,292 B2* | 8/2013 | Cho | H04N 5/23245 348/207.99 |
|---|---|---|---|
| 2003/0202115 A1 | 10/2003 | Sugimoto et al. | |
| 2005/0231625 A1 | 10/2005 | Parulski et al. | |
| 2007/0269200 A1 | 11/2007 | Rai et al. | |
| 2008/0079841 A1 | 4/2008 | Cieslinksi | |
| 2010/0053346 A1 | 3/2010 | Mitsunaga | |
| 2010/0265357 A1 | 10/2010 | Liu et al. | |
| 2012/0293699 A1 | 11/2012 | Blanquart et al. | |
| 2013/0057714 A1* | 3/2013 | Ishii | H04N 5/23248 348/208.4 |

OTHER PUBLICATIONS

United States Office Action for U.S. Appl. No. 13/486,707, Jan. 6, 2014, 12 pages.
United States Office Action for U.S. Appl. No. 13/486,707, Jul. 2, 2014, 14 pages.

* cited by examiner

*Primary Examiner* — Nhan T Tran
*Assistant Examiner* — Chan Nguyen
(74) *Attorney, Agent, or Firm* — Fenwick & West LLP (57) ABSTRACT Cinematic motion blur and other cinematic effects are enabled during image capture through exposure timing manipulation. The resulting captured images and videos include one or more cinematic effects without the need for a user to impose the cinematic effects post-capture.

18 Claims, 5 Drawing Sheets

CINEMATIC IMAGE BLUR IN DIGITAL CAMERAS BASED ON EXPOSURE TIMING MANIPULATION

CROSS REFERENCE TO RELATED APPLICATIONS

This application is a continuation of U.S. application Ser. No. 13/486,707, filed Jun. 1, 2012, now U.S. Pat. No. 8,917,330, which is incorporated by reference in its entirety.

BACKGROUND

1. Field of Art

The disclosure generally relates to the field of digital image capture, and more specifically to the manipulation of exposure timing to achieve cinematic image blurring.

2. Description of the Related Art

The advancement of digital video and image encoding has led to increasingly sophisticated image capture techniques. The capture of digital images by an image capture device (hereinafter "camera") is performed by an image sensor. Many types of image sensors are commonly used in cameras and other image-capturing devices, such as charge-coupled devices (CCDs) and complementary metal-oxide-semiconductors (CMOSs). Image sensors convert light, such as light entering the aperture of a camera through a camera lens, into image information. In this way, a camera can "capture" objects before it by converting the light reflected from the objects and passing through the camera lens into an image.

Modern image sensors are able to capture a large amount of light in a relatively small window. This allows cameras to capture frames with very small exposures, which produces very sharp images. However, such image capture can produce undesirably crisp images when played back in video format. In some applications, such as cinema, it is desirable to have a high amount of motion blur in each image, which requires relatively long exposure times. However, due to the high light sensitivity of modern images sensors, images with long exposure times become over exposed, and are not suitable for viewing. Therefore, a process is needed to allow modern image sensors to achieve motion blur without over exposing the image.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The example embodiments described herein beneficially allow for the inclusion of various cinematic effects in images during the capture of the images by a camera, as opposed to creating these effects post-image capture. One example of a cinematic effect is the motion blur found in images and video captured by traditional film cameras. This motion blur is a desirable effect, as it is often associated with big-budget theatrical releases. Depending on the intensity of the motion blur, it can also create a retro effect often found in hand-held cameras. Another example of a cinematic effect is color emphasis, where one of the three primary colors (red, blue, or green) is emphasized or deemphasized during image capture. In the case where red is emphasized, it creates an image that looks warmer than it actually is, and may be useful for artificially creating the look of dawn or dusk in an image.

System Architecture

Figure 1:
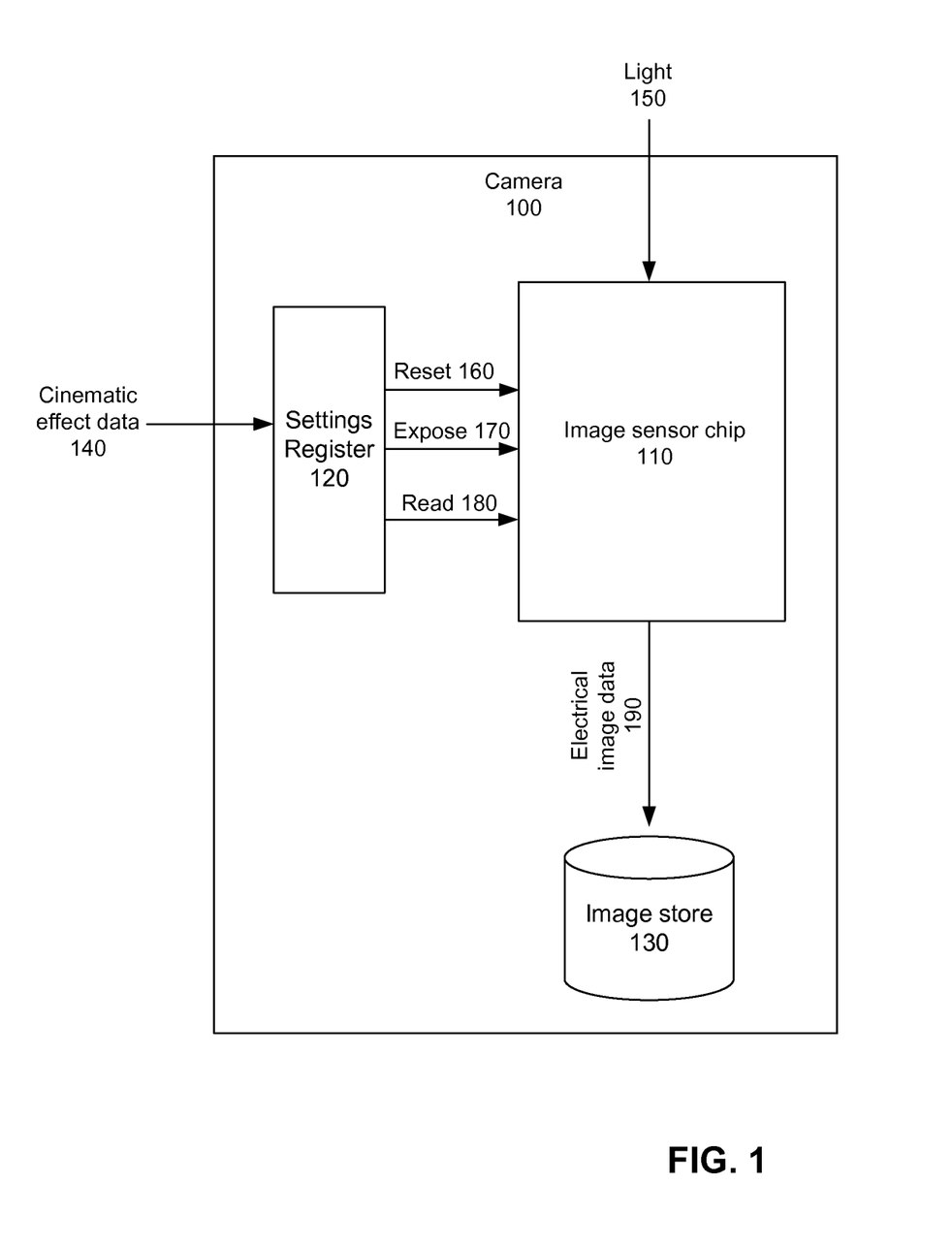
FIG. 1 illustrates a block diagram of a camera including an image capture system enabling exposure timing manipulation according to one example embodiment.

FIG. 1 illustrates a block diagram of a camera 100 including an image capture system enabling exposure timing manipulation according to one example embodiment. The camera 100 includes an image sensor chip 110, a settings register 120, and an image store 130. The settings register receives cinematic effect data 140, and outputs reset 160, expose 170, and read 180 signals to the image sensor chip based on the received cinematic effect data 140. The image sensor chip receives light 150, and based on the reset, expose, and read signals, outputs electrical image data 190 based on the received light to the image store. For the sake of clarity, FIG. 1 depicts only one representative camera, though any possible camera, such as a 3D camera with, for example, a plurality of image sensor chips and settings registers, can support exposure timing manipulation.

The image sensor chip 110 captures light 150 incident upon the image sensor for conversion by the camera 100 into electrical image data 190. The image sensor chip is described in greater detail in FIG. 3. The image sensor chip also receives reset 160, expose 170, and read 180 signals from the settings register 120, which control respectively the reset, expose, and read functionalities of the image sensor chip. In many embodiments, the image sensor chip is a charge-coupled device (CCD) or a complementary metal-oxide-semiconductor (CMOS), which converts photons incident upon the image sensor chip to stored charges. The image sensor chip also includes circuitry (not illustrated in the embodiment of FIG. 1) to convert these stored charges into a digital signal that forms the basis for the electrical image data 190. In addition, the image sensor chip may also include a lens or filter, such as a Bayer filter, or any other component commonly included in image sensor chips, though these components are omitted from the embodiment of FIG. 1 for the purposes of simplicity.

The settings register 120 receives cinematic effect data 140, for instance from a user of the camera 100, and converts the received cinematic effect data into reset 160, expose 170, and read 180 signals, which are subsequently transmitted to the image sensor chip 110. The settings register is described in greater detail in FIG. 3. In various embodiments, the settings register is contained partially or entirely within the image sensor chip.

The image store 130 stores electrical image data 190 produced by the image sensor chip 110. The image store may be any type of non-transitory computer-readable storage media, for example a hard drive or flash memory. The image store may store the electrical image data as RAW image data, or it may first convert or compress the data into a known image or video format, such as JPG or MPEG, prior to storing the electrical image data. In various embodiments, for example when the camera is used to capture movies, the image store is only a temporary store, holding a small number of frames that are subsequently transmitted to a main image store (not shown). For the purposes of this application, any reference to an "image store" is meant to include the image store 130 and any other supplementary image stores as used in embodiments of the invention.

The cinematic effect data 140 instructs the settings register 120 to generate the reset 160, expose 170, and read 180 signals to produce a particular cinematic effect. For example, the cinematic effect described by the cinematic effect data might be a "1950's hand-held camera" effect, and in response to receiving the cinematic effect data, the settings register generates the reset, expose, and read signals required to produce such an effect. An alternative cinematic effect includes a degree of motion blur (e.g., "90 degree exposure") to apply to an image. The cinematic effect data might also explicitly specify the exposure times (e.g., "Exposure from 0 to 0.01 seconds, from 0.03 to 0.04 seconds, and from 0.06 to 0.07 seconds"). If exposure settings have been pre-programmed in the settings register, the cinematic effect data might simply specify the pre-programmed setting (e.g., "Exposure pattern 3"). The process by which cinematic effect data becomes reset, expose, and read signals is described in more detail below with respect to FIG. 2.

The reset 160, expose 170, and read 180 signals control the reset, expose, and read functionalities of the image sensor chip 110, respectively. In general, each of the reset, expose, and read signals comprise a digital pulse train, wherein a first value (e.g., 1) instructs the image sensor to enable that feature, and a second value (e.g., 0) instructs the image sensor to disable that feature, though other configurations may be utilized in other embodiments. Example expose pulse trains are shown in FIG. 4. In various embodiments, certain features (like expose) might have a plurality of "enable" states, and the pulse pattern may then step between more than two values. The reset, expose, and read signals are described in more detail below with respect to FIG. 3.

The electrical image data 190 is the image data produced by the image sensor chip 110 and representing the light incident upon the image sensor chip during one or more exposure periods. As described above, the electrical image data 190 may be produced in a variety of formats, and may include a variety of effects as specified by the cinematic effect data.

Figure 2:
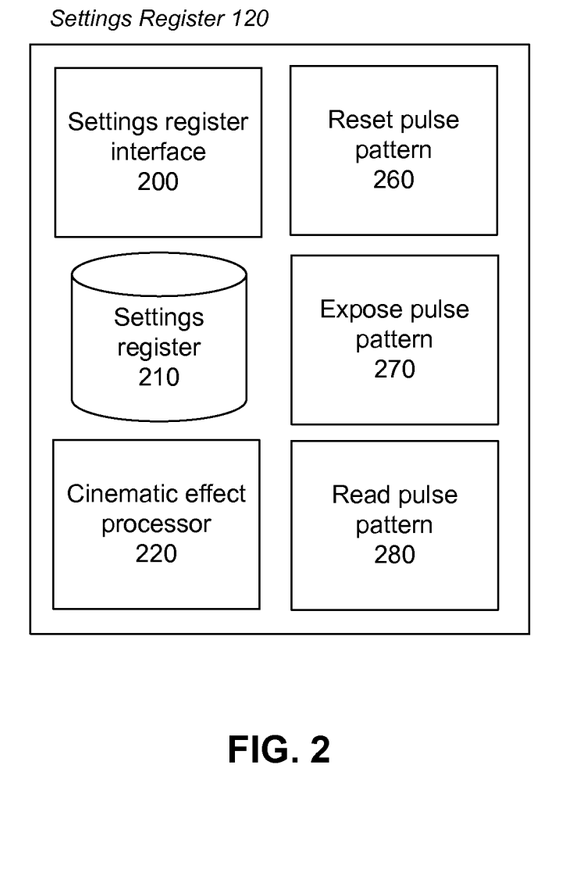
FIG. 2 illustrates a settings register for supporting exposure timing manipulation according to one example embodiment.

FIG. 2 illustrates a settings register for supporting exposure timing manipulation according to one example embodiment. The settings register includes a settings register interface module 200, a settings register store 210, a cinematic effect processor 220, a reset pulse pattern module 260, an expose pulse pattern module 270, and a read pulse pattern module 280.

The settings register interface module 200 receives cinematic effect data from the camera 100 and sends reset, expose, and read signals produced by the settings register 120 to the image sensor chip 110. When the settings register receives cinematic effect data 140, the interface module collects the data, and provides it to the cinematic effect processor 220. When the reset 260, expose 270, and read 280 pulse pattern modules have generated reset 160, expose 170, and read 180 signals, the interface module outputs these signals to the image sensor chip 110. In some embodiments, any updates to the firmware or settings of the settings register will be received by the interface module and sent to the settings register store 210.

The settings register store 210 stores data representing various cinematic image effect settings. For example, the settings register store may store pre-determined conversion algorithms for converting cinematic effect data 140 to reset 160, expose 170, and read 180 pulse signals configured to produce a particular cinematic effect associated with the cinematic effect data. The settings register store 210 may additionally store user preferences. For example, a user may specify, using an interface on the camera (not illustrated in the embodiment of FIG. 2), an exposure timing manipulation setting for storage in the settings register store and subsequent use. The settings register store may also store firmware for the settings register, which may, for example, define the protocol used for outputting the reset, expose, and read signals via the settings register interface 200.

The cinematic effect processor 220 converts cinematic effect data 140 into data for use by the reset 260, expose 270, and read 280 pulse pattern modules. The cinematic effect processor receives the cinematic effect data from the interface module 200, and retrieves a conversion algorithm from the settings register store 210 based on the cinematic effect data. Based on the retrieved conversion algorithm, the cinematic effect processor determines the appropriate timing and duration for the reset 160, expose 170, and read 180 signals, and instructs the reset 260, expose 270, and read 280 pulse pattern modules, respectively, to create the appropriate pulse patterns for the rest, expose, and read signals.

In one example, if the cinematic effect data specifies a "180 degree exposure with 4 sub-exposures" effect, the retrieved conversion algorithm first determines a frame duration, an exposure window, and a net exposure time associated with the cinematic effect data, and determines that each frame should have 4 sub-exposures spaced evenly within the first ½ of the frame (corresponding with a 180 degree exposure window). In this example, the cinematic effect processor 220 determines that the first sub-exposure is ¼ of the length of the net exposure time and starts at the beginning of the frame. It also determines that the other three sub-exposures are the same length and are spread equally throughout the first ½ of the frame duration. Additional cinematic effects and the reset, expose, and read signals associated with such effects are discussed in greater detail below with regards to FIG. 4.

The reset 260, expose 270, and read 280 pulse pattern modules generate reset, expose, and read pulse patterns, respectively, based on the instructions of the cinematic effect processor. Each of the modules receives parameters for a pulse pattern from the cinematic effect processor 220. For example, the cinematic effects processor 220 may send a list of initial signal values and signal switch times (indicating when the value of a particular signal is to switch) to each of the reset, expose, and read modules. From these parameters, the reset, expose, and read modules each generate a pulse train signal, and send the generated pulse train signals to the interface module 200 for outputting as the reset 160, expose 170, and read 180 signals, respectively.

Figure 3:
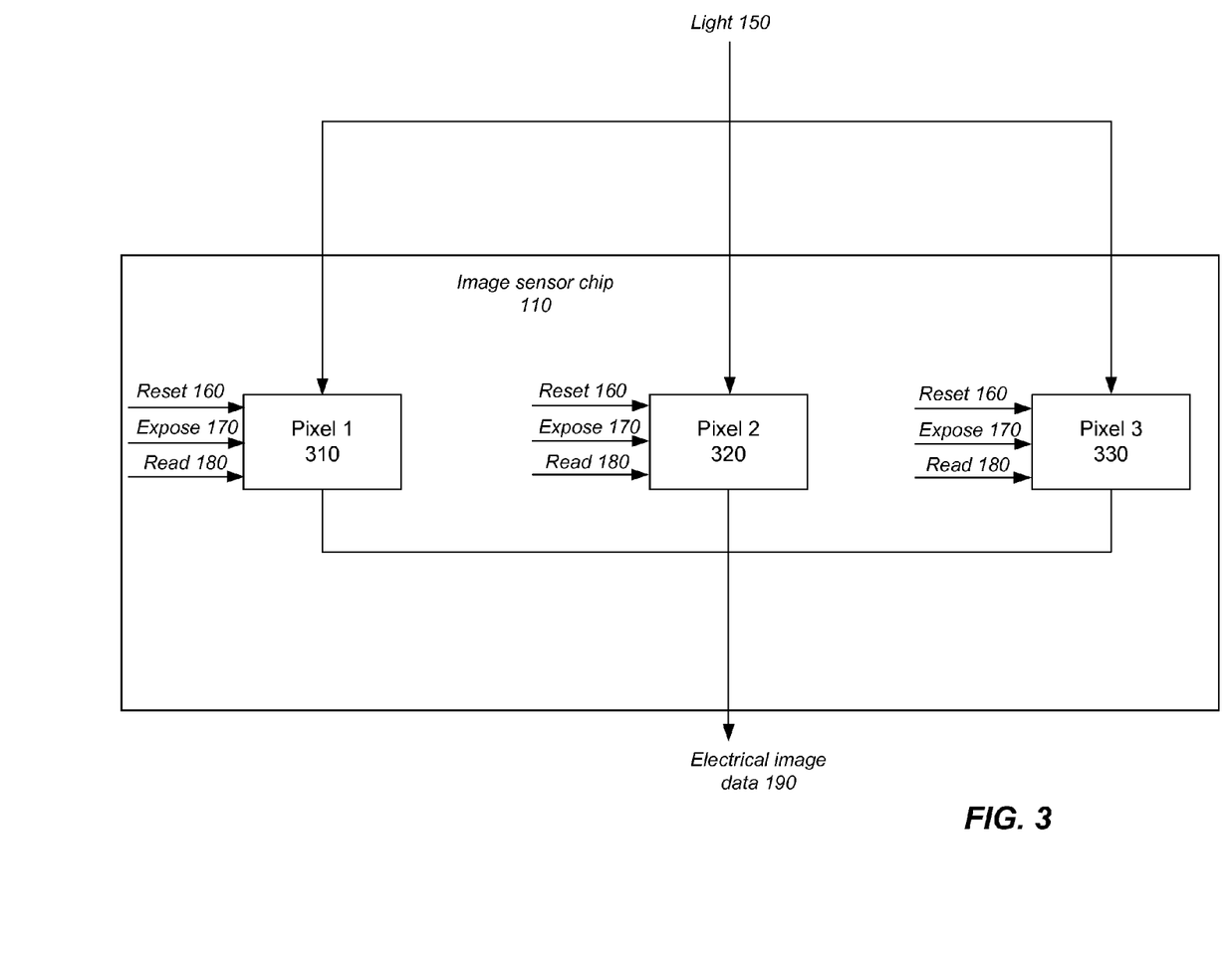
FIG. 3 illustrates the operation of an image sensor chip according to one example embodiment.
Figure 4:
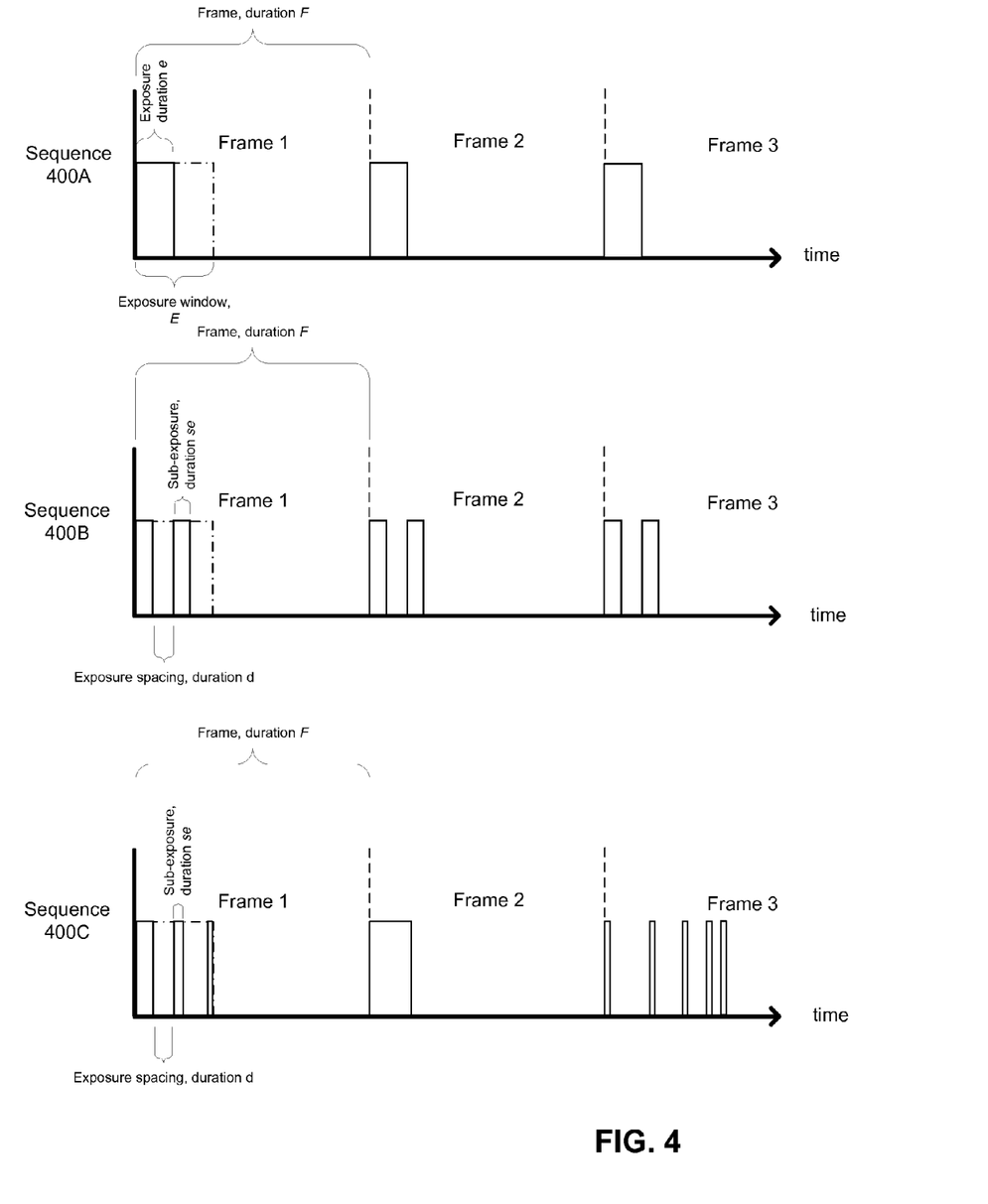
FIG. 4 illustrates example frame sequences showing various examples of exposure timing manipulation according to one example embodiment.

Referring next to FIG. 3, it illustrates the operation of an image sensor chip 110 according to one example embodiment. The image sensor chip includes three pixels, pixel 1 310, pixel 2 320, and pixel 3 330. "Pixel" as used herein represents an area of the image sensor chip 110 on which incident light is converted into information describing an associated image pixel. The pixels may use a CCD, a CMOS, or any image sensor capable of converting photons of light to an electrical signal. Each pixel receives the light 150 and outputs electrical image data 190 representing the light based on the received reset 160, expose 170, and read 180 signals. Although not illustrated in the embodiment of FIG. 3, each pixel includes one or more capacitors configured to store charge produced by the pixel in response to being exposed to light incident upon the pixel. The image sensor chip 110 may also have a lens or filter (not shown) through which the light passes before reaching the pixels. In general, the image sensor chip 110 will comprise thousands or millions of pixels arrayed in a grid, but only three are shown here, in this configuration, for clarity.

The reset signal 160 controls the reset functionality of each pixel. The pixel, upon receiving an enabled reset signal, is configured to discharge any charge stored in the pixel's capacitors, and reset any internal registers storing light and image data at various stages of transition through the pixel. Upon receiving an enabled expose signal, the pixel is configured to expose itself to light incident upon the pixel. For example, upon receiving an enabled expose signal, the pixel begins capturing light, and upon receiving a disabled expose signal, the pixel stops capturing light. Note that because the expose signal may be a pulse train, the pixel may capture light incident upon it during each of several sub-exposures for a particular frame in a short period of time. In some embodiments, the charges produced by these sub-exposures are accumulated inside the capacitors of the pixel. Upon receiving an enabled read signal, the pixel is configured to output information representing the one or more exposures of the pixel. For example, upon receiving an enabled read signal, the pixel outputs information representing the stored charge of the pixel. In this embodiment, the pixel may convert the stored charge into a digital representation of the stored charge using, for example, an analog-to-digital converter (not illustrated in the embodiment of FIG. 3). The information representing the one or more exposures of the pixels output by each pixel is combined to form the electrical image data 190. In some embodiments, the electrical image data is digitally processed by the image sensor chip 110 prior to being output by the image sensor chip 110.

Example Frame Sequences for Enabling Cinematic Effects

FIG. 4 illustrates example frame sequences showing various examples of exposure timing manipulation according to one example embodiment. Each sequence is three frames long, and is representative of various exposure timing manipulation schemes. It should be noted that although three-frame sequences are illustrated in the embodiment of FIG. 4, frame sequences of any length, including a single frame sequence, can benefit from exposure timing manipulation. The horizontal axis indicates the passage of time, with time progressing to the right, and the vertical axis indicates the exposure signal 170, where a low value indicates a disabled exposure signal, and a high value indicates an enabled exposure signal. The dotted exposure window, E, represents a traditional film camera exposure window associated with a desired cinematic effect. Though not shown, before capturing a frame, the image sensor chip 110 may be reset, wherein the reset signal 160 is enabled for some period of time and then disabled. Also not shown, after capturing a frame, the image sensor chip 110 may be read out, wherein the read signal 180 is enabled for some period of time and then disabled.

Sequence 400A illustrates a traditional digital camera exposure pattern, contrasted against a traditional film camera 90-degree exposure window, E. Of note, the film camera exposure is much longer than a digital exposure, which creates the appearance of motion blur on the film frame. Due to the heightened sensitivity of the image sensor chip 110 relative to the film camera, the digital exposure occurs faster. Due to differences in the technology between the film and digital cameras, both capture substantially the same amount of light, even though the exposure times differ. Sequence 400A shows three separate frames with substantially identical exposure durations, e. However, in various embodiments, different frames may have different exposure durations to account for variable amounts of light. For example, during the time of the first frame, the camera may be pointed at a very bright light source, so the total exposure time may be relatively short in order to prevent over exposure, and during the time of the second frame, the camera may be pointed at a very dark scene, so the total exposure time may be relatively long in order to capture sufficient light. It should be noted that exposure durations and locations within a frame duration occur may occur entirely within an exposure window E associated with a traditional film camera exposure period.

Sequence 400B illustrates a sequence of frames with a modified exposure timing exposure pattern, contrasted against a traditional film camera 90-degree exposure window. Each frame in this sequence has two sub-exposures. Since there are two sub-exposures, each sub-exposure duration se is substantially the same as ½ of the single exposure duration e in the sequence 400A. This allows the total exposure time to be substantially equal to the single exposure duration e, resulting in a substantially similar amount of total captured light by the image sensor chip 110. In various embodiments, the sub-exposures will have different sub-exposure times (see sequence 400C) in order to compensate for variable brightness. Note that the second sub-exposure starts at a time substantially equal to ½ of the exposure window, E. As the sub-exposures occur over a wider range of the frame, this allows each frame to capture more motion, and therefore to have more motion blur. If the sub-exposures were attempting to replicate a traditional film 180-degree exposure window, then the second sub-exposure start time would be substantially equal to V2 of the traditional film 180-degree exposure window duration.

Sequence 400C illustrates a sequence of frames with various examples of modified exposure timing exposure patterns, contrasted against a traditional film camera 90-degree exposure window. In this sequence, both modified exposure timings (see frames 1 and 3) and a normal single exposure (see frame 2) are used. The first frame shows an example embodiment exposure pattern wherein the exposure spacing duration, d, between the frames is substantially the same, but the individual sub-exposure durations se are different. In this embodiment, there are three sub-exposures, with the first sub-exposure having a longer duration than the second, and the second having a longer duration than the third, each occurring within the exposure window E. This changes the characteristics of the frame, weighing the image motion at the beginning of the frame more heavily than the image motion at the middle or end of the frame. The second frame has a normal exposure (see sequence 400A above). The third frame shows an example embodiment exposure pattern wherein the exposure spacing duration, d, between the frames decreases after each subsequent sub-exposure, but the individual sub-exposure durations, se, are substantially the same. In this embodiment, the exposure timing decreases approximately exponentially. This exposure pattern weighs the image motion at the middle or end of the frame more heavily than the image motion at the beginning of the frame.

Capturing Image Data Using Exposure Timing Manipulation

Figure 5:
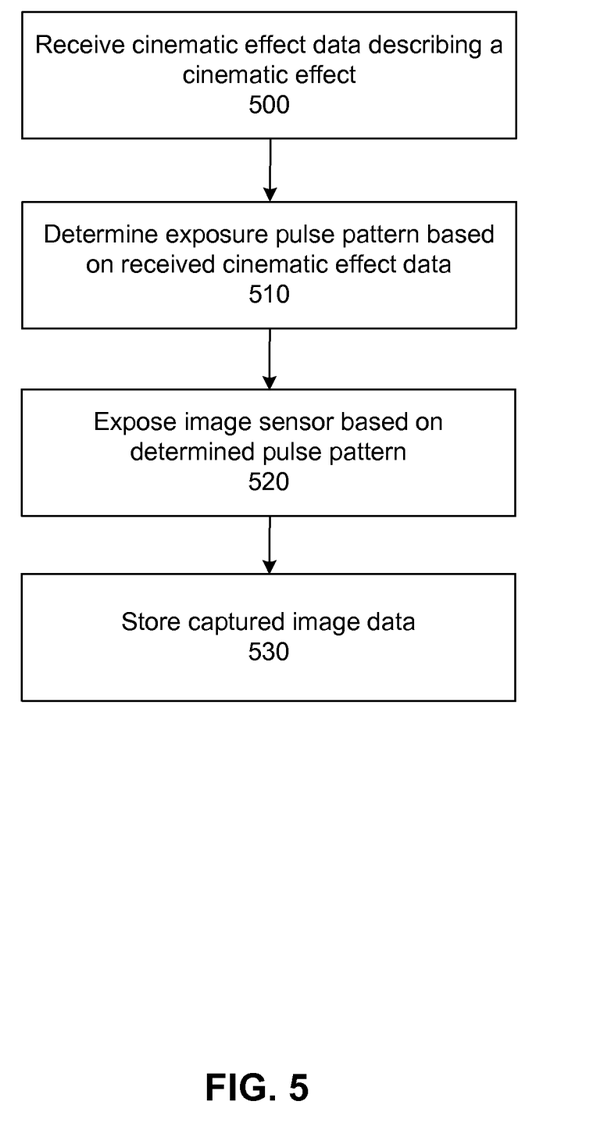
FIG. 5 is a flow chart for the process of capturing image data using exposure timing manipulation according to one example embodiment.

FIG. 5 is a flow chart for an example process of capturing image data using exposure timing manipulation. A camera, e.g., camera 100, receives 500 the cinematic effect data described a particular cinematic effect for use by the camera, such as motion blur. The cinematic effect data may originate from a user (for example, by manual entry of the cinematic effect data with a keypad or other interface), or from a separate computer (not shown) associated with the camera.

An image sensor exposure pattern is determined 510 by the camera based on the received cinematic effect data. The determined exposure pattern represents a starting time and ending time for a pattern of one or more image sensor sub-exposures within a particular image frame. The determined exposure pattern may be converted into a signal for use by the camera in manipulating the exposure to light of a camera image sensor.

The image sensor is exposed 520 to light in a pattern based on the determined exposure pattern. The light captured by the image sensor during the exposure pattern is converted into image data and stored 530 at the camera, for instance in a non-transitory computer-readable storage medium at the camera. Prior to storage, the image data may be manipulated, formatted, or otherwise processed by the image sensor, or by another component of the Camera.

Additional Configuration Considerations

A configuration as described herein advantageously enables the inclusion of various cinematic effects in images at the time the images are captured by a camera. For example, effects such as motion blur can be simulated at the time of image capture. Moreover, an intensity of the motion blur can also be controlled to create effects such as a retro effect. Another example of a cinematic effect is color emphasis, where one of the three primary colors (red, blue, or green) is emphasized or deemphasized during image capture. In the case where red is emphasized, it creates an image that looks warmer than it actually is, and may be useful for artificially creating the look of dawn or dusk in an image.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

What is claimed is:

1. A method for generating cinematic blur in a digital camera, the method comprising:
    accessing a cinematic effect comprising a total exposure time for a digital image sensor of the digital camera and an effective exposure time;
    generating a pulse pattern for the image sensor comprising a plurality of pulse durations such that consecutive pulse durations are separated by non-zero spacing durations, the sum of the plurality of pulse durations substantially equal to the total exposure time and the sum of the plurality of pulse durations and spacing durations being substantially equal to or less than the effective exposure time;
    applying the generated pulse pattern to the image sensor;
    capturing, by the image sensor, image information representative of light incident upon the image sensor, the image information representative of light incident upon the image sensor during the pulse durations and not representative of light incident upon the image sensor during the spacing durations; and
    storing the captured image information.

2. The method of claim 1, wherein the effective exposure time is selected to correspond to an exposure time for a film camera.

3. The method of claim 1, wherein two or more of the pulse durations comprise the same duration.

4. The method of claim 1, wherein two or more of the pulse durations comprise different durations.

5. The method of claim 1, wherein two or more of the spacing durations comprises the same duration.

6. The method of claim 1, wherein two or more of the spacing durations comprise different durations.

7. A camera system comprising a digital image sensor, a processor, and a non-transitory computer-readable storage medium storing instructions configured to, when executed by the processor, cause the camera system to:
 access a cinematic effect comprising a total exposure time for the digital image sensor and an effective exposure time;
 generate a pulse pattern for the image sensor comprising a plurality of pulse durations such that consecutive pulse durations are separated by non-zero spacing durations, the sum of the plurality of pulse durations substantially equal to the total exposure time and the sum of the plurality of pulse durations and spacing durations being substantially equal to or less than the effective exposure time;
 apply the generated pulse pattern to the image sensor;
 configure the image sensor to capture image information representative of light incident upon the image sensor, the image information representative of light incident upon the image sensor during the pulse durations and not representative of light incident upon the image sensor during the spacing durations; and
 store the captured image information.

8. The camera system of claim 7, wherein the effective exposure time is selected to correspond to an exposure time for a film camera.

9. The camera system of claim 7, wherein two or more of the pulse durations comprise the same duration.

10. The camera system of claim 7, wherein two or more of the pulse durations comprise different durations.

11. The camera system of claim 7, wherein two or more of the spacing durations comprises the same duration.

12. The camera system of claim 7, wherein two or more of the spacing durations comprise different durations.

13. A non-transitory computer readable storage medium having executable computer program instructions embodied therein for execution by a camera processor, the instructions comprising steps for:
 accessing a cinematic effect comprising a total exposure time for a digital image sensor and an effective exposure time;
 generating a pulse pattern for the image sensor comprising a plurality of pulse durations such that consecutive pulse durations are separated by non-zero spacing durations, the sum of the plurality of pulse durations substantially equal to the total exposure time and the sum of the plurality of pulse durations and spacing durations being substantially equal to or less than the effective exposure time;
 applying the generated pulse pattern to the image sensor;
 configuring the image sensor to capture image information representative of light incident upon the image sensor, the image information representative of light incident upon the image sensor during the pulse durations and not representative of light incident upon the image sensor during the spacing durations; and
 storing the captured image information.

14. The computer-readable storage medium of claim 13, wherein the effective exposure time is selected to correspond to an exposure time for a film camera.

15. The computer-readable storage medium of claim 13, wherein two or more of the pulse durations comprise the same duration.

16. The computer-readable storage medium of claim 13, wherein two or more of the pulse durations comprise different durations.

17. The computer-readable storage medium of claim 13, wherein two or more of the spacing durations comprises the same duration.

18. The computer-readable storage medium of claim 13, wherein two or more of the spacing durations comprise different durations.

* * * * *